(12) United States Patent
Tabb

(10) Patent No.: US 9,275,297 B2
(45) Date of Patent: Mar. 1, 2016

(54) TECHNIQUES FOR IDENTIFYING PARKING LOTS IN REMOTELY-SENSED IMAGES BY IDENTIFYING PARKING ROWS

(71) Applicant: DigitalGlobe, Inc., Longmont, CO (US)

(72) Inventor: Mark Tabb, Longmont, CO (US)

(73) Assignee: DigitalGlobe, Inc., Longmont, CO (US)

( * ) Notice: Subject to any disclaimer, the term of this patent is extended or adjusted under 35 U.S.C. 154(b) by 256 days.

(21) Appl. No.: 14/053,332

(22) Filed: Oct. 14, 2013

(65) Prior Publication Data

US 2015/0104070 A1   Apr. 16, 2015

(51) Int. Cl.
   *G06K 9/00*   (2006.01)
   *G06K 9/46*   (2006.01)

(52) U.S. Cl.
   CPC .......... *G06K 9/4633* (2013.01); *G06K 9/00637* (2013.01)

(58) Field of Classification Search
   None
   See application file for complete search history.

(56) References Cited

U.S. PATENT DOCUMENTS

| | | | | |
|---|---|---|---|---|
| 5,291,563 A * | 3/1994 | Maeda | ..................... | G06K 9/52 348/135 |
| 5,963,670 A | 10/1999 | Lipson et al. | | |
| 5,995,668 A * | 11/1999 | Corset | ...................... | G06T 9/20 375/240.16 |
| 6,285,297 B1 | 9/2001 | Ball | | |
| 7,116,246 B2 * | 10/2006 | Winter | ..................... | G08G 1/14 340/932.2 |
| 2010/0303287 A1 * | 12/2010 | Morton | ............... | G01N 23/046 382/100 |
| 2013/0039532 A1 * | 2/2013 | Carbonell | .......... | G06K 9/00785 382/103 |
| 2013/0113936 A1 * | 5/2013 | Cohen | .................... | G07B 15/02 348/148 |
| 2015/0104070 A1 * | 4/2015 | Tabb | .................... | G06K 9/4633 382/104 |

FOREIGN PATENT DOCUMENTS

KR    1020000049305 A    8/2000

OTHER PUBLICATIONS

Wang, et al, "Parking Lot Analysis and Visualization from Aerial Images," Applications of Computer Vision, 1998, WACV '98, Proceedings, Fourth IEEE Workshop on, Princeton, NJ; IEEE Oct. 19-21, 1998, pp. 36-41.
International Search Report for PCT/US2014/055216, Dec. 12, 2014.

* cited by examiner

*Primary Examiner* — Tahmina Ansari
(74) *Attorney, Agent, or Firm* — Robert G. Crouch; Daniel A. Staley; Marsh Fischmann & Breyfogle LLP

(57) ABSTRACT

Processing and analyzing at least one remotely-sensed image to automatically detect and identify parking lots within a region of the remotely-sensed image. This may include: (1) receiving a remotely-sensed image having zero or more parking lots; (2) identifying a set of pixels related to parking lot features within the remotely-sensed image; (3) identifying at least one parking row within the remotely-sensed image; and (3) identifying a parking lot based on the identified parking rows. Identifying at least one parking lot may further include using first, second, third, and fourth level modules, such as a concrete/asphalt detection module, a road marking detection module, a vehicle detection module, and a Hough aggregation for parking row detection module.

14 Claims, 14 Drawing Sheets

TECHNIQUES FOR IDENTIFYING PARKING LOTS IN REMOTELY-SENSED IMAGES BY IDENTIFYING PARKING ROWS

BACKGROUND

Information regarding parking lot infrastructure may be used for various commercial and non-commercial applications. The ability for businesses and governments to identify and monitor parking lot infrastructure can play a critical role in determining economic development, predicting future trends, and in developing mapping software. Readily available remotely-sensed imagery has significantly improved this ability to identify and monitor parking lot infrastructure. However, such imagery includes vast amounts of data that is difficult to process efficiently to a high degree of accuracy. Prior art methods have been developed for detecting and identifying parking lots in remotely-sensed imagery with efficiency and accuracy drawbacks. Such methods are typically limited to specific types of imagery and are unreliable. They often locate parking lots where none exist or fail to identify parking lots that are remotely located, relatively small, or located on building roof-tops. Moreover, such methods typically lack sufficient detail related to the parking lot features, such as, for example, dimensions and locations of parking rows. Many prior art methods also rely heavily on manual extraction.

SUMMARY

The disclosure relates to systems and methods for detecting and identifying parking lots in remotely-sensed digital images. A detailed and fully enabling disclosure is set forth in the detailed description section.

In one embodiment, the parking lot detection (PLD) system includes multiple modules that process and analyze at least one remotely-sensed image to automatically identify parking lots within a region. The multiple detection modules may include first, second, third, and fourth level detection modules as described below.

The first level module may include a concrete/asphalt detection (CAD) module. The CAD module may train a concrete/asphalt detector by analyzing training data related to a remotely-sensed image, such as a multispectral image. The analysis of the image may include assigning a value to pixel intensity data as well as to other variables related to the image with a land use/land cover classification system. The CAD module may then be trained (1) by designating positive instances to the targeted parking lot surface material, such as concrete and asphalt, and (2) by designating negative instances to the non-targeted parking lot surfaces.

The second level module may include a road marking detection (RMD) module. The RMD module may process the remotely-sensed imagery to identify lines within the imagery including road lines and parking lot lines, i.e. marking lines. The processing may include analyzing high-resolution images, such as panchromatic imagery, to extract marking lines for street centerlines and parking lots. Panchromatic images or other suitable high-resolution images may be required to extract the marking lines because the marking line features are less than a pixel in width and are not typically available to an acceptable degree of accuracy in lower-resolution imagery.

The third level module may include a vehicle detection (VD) module that processes data from the remotely-sensed imagery to develop a vehicle detector. The processing includes analyzing high-resolution imagery to detect vehicles using classifiers based on detection features.

The fourth level module may include Hough aggregation for parking row detection (HAPRD) module that processes data from the remotely-sensed imagery to detect and identify parking rows. The processing includes analyzing the imagery to achieve robust detection of parking rows by exploiting a spatial regularity property commonly found in parking rows and assigning parameters to describe the parking rows.

The multiple modules including the CAD, RMD, VD, and HAPRD modules may interact simultaneously or separately to detect and identify parking lots in remotely-sensed imagery with a high degree of accuracy and increased processing speed. For example, in some embodiments, the CAD module may process a remotely-sensed image such as a multispectral image while the RMD and VD modules are processing a higher-resolution-remotely-sensed image such as a panchromatic image. After the CAD, RMD and VD modules process the images, the PLD system may mask the image processed by the CAD module with the image processed by the RMD and VD modules. The masked images may then be separately or simultaneously processed by the HAPRD module to detect and identify parking lots within the masked image.

In one embodiment, the method for identifying parking lots in a remotely-sensed image may include receiving a first remotely-sensed image having zero or more parking lots. The first remotely-sensed image may include a multispectral image. Once received, the method may include identifying a first set of pixels related to a parking lot surface material within the first remotely-sensed image with a first level module, such as the CAD module, to create a first tagged image. Next, the method may include receiving a second remotely-sensed image having zero or more parking lots. The second remotely-sensed image may include a panchromatic image or short-wave infrared image. The method may then include identifying a second set of pixels related to parking lot markings within the second remotely-sensed image with a second level module, such as the RMD module, to create a second tagged image. The method may then include masking the first tagged image with the second tagged image to create a first masked image. The method may further include identifying at least one parking lot object of interest within the second remotely-sensed image with a third level module, such as the VD module to create a third tagged image. The method may then include masking the first tagged image with the third tagged image to create a second masked image. The method may also include identifying at least one parking row within the first and second masked images with a fourth level module, such as the HAPRD module and then identifying a parking lot based on the identified at least one parking row. In some embodiments, the method may further include compensating for a bidirectional reflectance distribution between remotely-sensed images having different domains. In addition, the method may include compensating for materials having spatial and temporal variability between remotely-sensed images having different domains.

In another embodiment, the method for identifying parking lots in a remotely-sensed image may include receiving at least one remotely-sensed image having zero or more parking lots. The method may include identifying a first set of pixels related to a parking lot surface material within the remotely-sensed image with a first level module, such as the CAD module. Next, the method may include identifying a second set of pixels related to parking lot markings within the remotely-sensed image with a second level module, such as the RMD module. The method may also include identifying at least one parking lot object of interest, such as a vehicle, within the remotely-sensed image with a third level module, such as the VD module. The method may then include identifying at least one parking row within the remotely-sensed image with a fourth level module such as the HAPRD module that detects the at least one parking row based on data received from the first, second, and third level modules. The method may then include identifying a parking lot based on information from the first, second, third, and fourth modules. In some embodiments, the HAPRD module may also exploit at least one spatial regularity property commonly found in parking rows. The HAPRD module may then analyze the at least one remotely-sensed image based on the exploited spatial regularity property and identify zero or more parking rows in the at least one remotely-sensed image.

In yet another embodiment, the method for identifying parking lots in a remotely-sensed image may include receiving a first remotely-sensed image having zero or more parking lots and identifying a first set of pixels related to a parking lot feature within the first remotely-sensed image with a first module to create a first image. The method may then include receiving a second remotely-sensed image having zero or more parking lots and masking the first image with the second remotely-sensed image to create a masked image. Once the masked image is created, the method may include identifying a second set of pixels related parking row features in the masked image and identifying a parking lot based on the identified at least one parking row features.

The above summary of some example embodiments is not intended to describe each disclosed embodiment or every implementation of the invention.

BRIEF DESCRIPTION OF THE DRAWINGS

The disclosure herein may be more completely understood in consideration of the following detailed description of various embodiments in connection with the accompanying drawings, in which.

Figure 1:
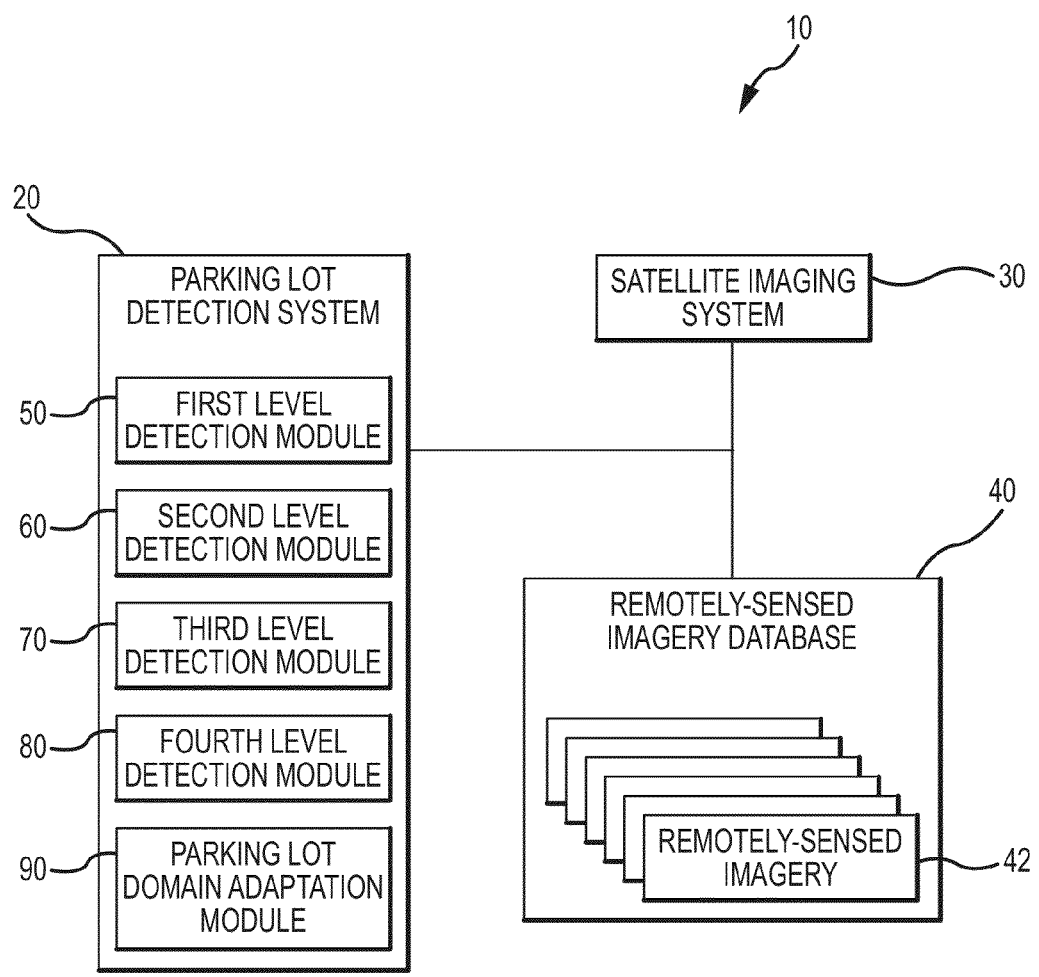
FIG. 1 is an exemplary embodiment of a remotely-sensed imagery processing system.

While the invention is susceptible to various modifications and alternative forms, specifics have been shown by way of example in the drawings and will be described in detail below. It should be understood that the intention of the detailed description is not to limit aspects of the invention to the particular embodiments described. On the contrary, the invention covers all modifications, equivalents, and alternatives falling within the spirit and scope of the invention.

DETAILED DESCRIPTION

The following defined terms disclosed in this detailed description shall apply, unless a different definition is given in the claims or elsewhere in this specification.

As used in this specification and the appended claims, the singular forms "a," "an," and "the" include the plural referents unless the content clearly dictates otherwise. As used in this specification and the claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into additional embodiments unless clearly stated to the contrary. While the embodiments may be described in terms of spatial orientation, the terminology used is not intended to be limiting, but instead to provide a straightforward description of the various embodiments.

Remotely-sensed imagery processing system 10 and methods comprise or implement various processes for detecting and identifying parking lots 44 in remotely-sensed imagery 42. Disclosed embodiments overcome prior art disadvantages in that they are more efficient with a higher degree of accuracy and may be used with panchromatic and short-wave infrared imagery.

Remotely-sensed imagery processing system 10 comprises parking lot detection (PLD) system 20 having various detection modules, as will be described in further detail below. Remotely-sensed imagery processing system 10 may include satellite imaging system 30 operatively associated with a satellite equipped with remote imaging sensors and at least one ground terminal. The ground terminal may comprise at least one communications dish and image processor that is operatively associated with a remotely-sensed imagery database 40 for storing remotely-sensed imagery 42. The satellite may communicate with the ground terminal by transmitting the remotely-sensed imagery 42 via radio waves to the communications dish that may then transmit imagery 42 to the remotely-sensed imagery database 40 that communicates via a communications link with PLD system 20. The communication link may comprise a wired communication links or wireless communication links. Components of remotely-sensed imagery processing system 10 may or may not be in the same physical location.

PLD system 20 may automatically process the remotely-sensed imagery 42 with various modules for use in connection with the methods described below to detect, identify, and monitor parking lots 44 within the remotely-sensed imagery 42. The various modules may comprise a first-level module 50, a second-level module 60, a third-level module 70, and a fourth-level module 80 for processing remotely-sensed imagery 42. In some embodiments, the remotely-sensed imagery 42 may be subjected to image radiometric correction using radiometric correction parameters. Remotely-sensed imagery 42, such as high-resolution-remotely-sensed imagery (1-10 m spatial resolution) and very high-resolution-remotely-sensed imagery (less than or equal to 1 m) for global coverage may be readily available from various satellites. Such satellites may include, for example, QuickBird, China-Brazil Earth Resources Satellite, System for Earth Observation, RapidEye, IKONOS 2, WorldView 1, WorldView 2, and WorldView 3. Existing prior art systems for processing remotely-sensed imagery 42 could be improved in the area of accurately detecting, identifying, and monitoring parking lots, which are difficult to identify due to their various configurations and sizes. Moreover, existing prior art systems fail to demonstrate the capacity to automatically extract parking lot information from high-resolution-remotely-sensed imagery 42 efficiently with acceptable processor clock cycles at a reduced computational cost.

Figure 2:
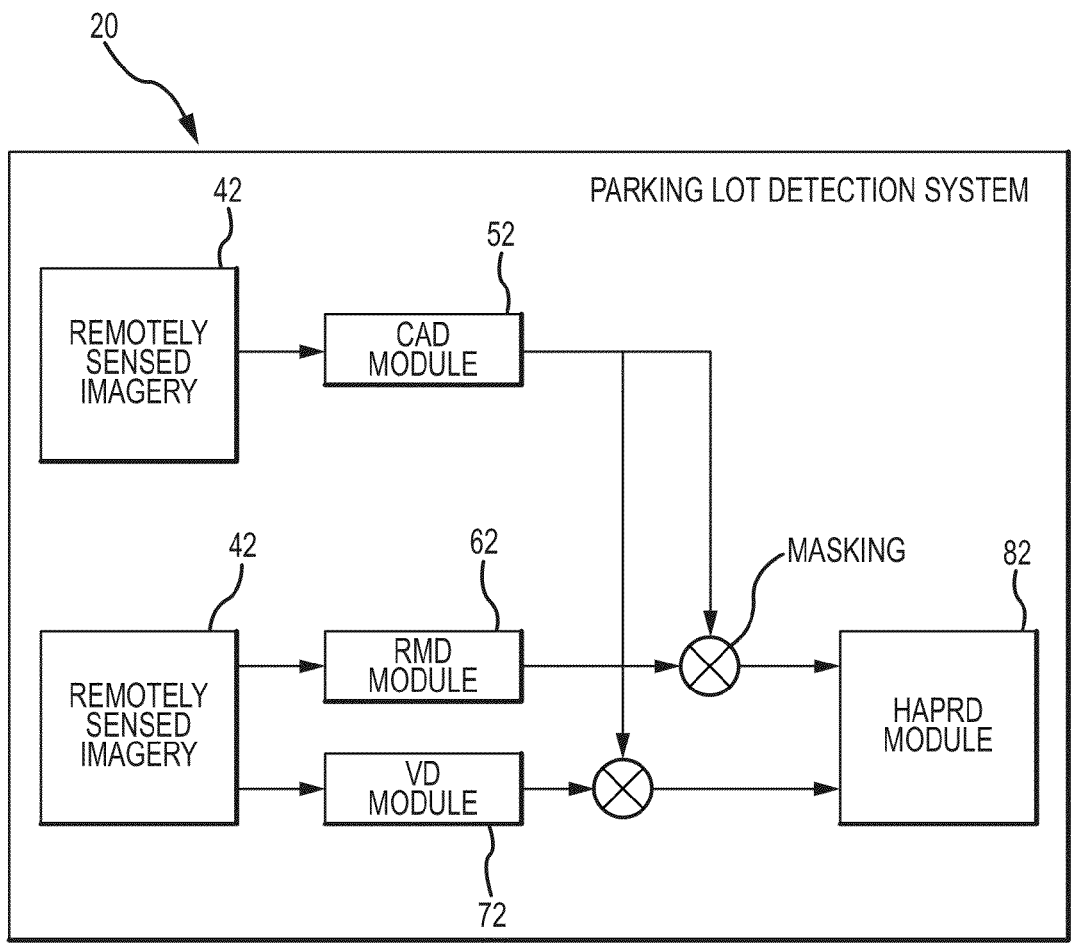
FIG. 2 is an exemplary embodiment of a parking lot detection system.
Figure 3:
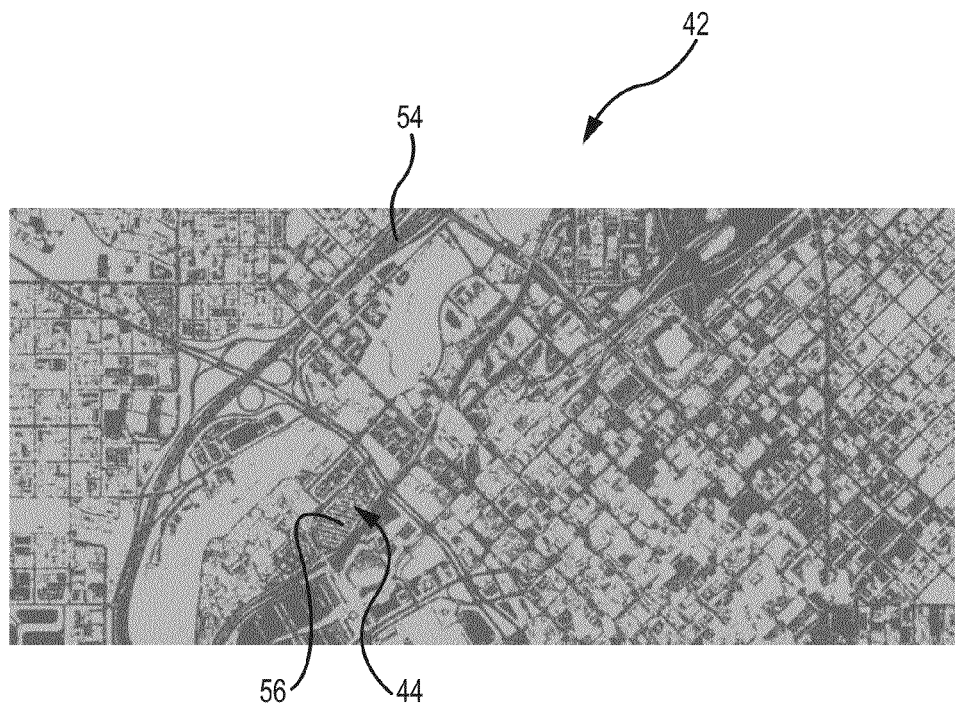
FIG. 3 is a remotely-sensed image showing detected parking lot surface material.

Primarily referring to FIGS. 1-3, the first level module 50 may include a concrete/asphalt detection (CAD) module 52. The CAD module 52 may be created by analyzing training data related to a remotely-sensed image 42, such as a multispectral image. The analysis of the remotely-sensed image 42 may include assigning a value to pixel intensity data as well as to other variables related to the remotely-sensed image 42 with a land use/land cover classification system. The land use/land cover classification system may use "random forest" learning methods for classification (set of decision tree classifiers) to apply majority voting to pixels during the classification decision to distinguish between different types of land coverage, such as, for example, asphalt, concrete, vegetation, and water. One example of a suitable land use/land cover classification system is disclosed in U.S. patent application Ser. No. 14/024,418, filed Sep. 11, 2013, the contents of which are incorporated herein by reference. The CAD module 52 may then be trained by designating positive instances to the targeted parking lot surface material, such as concrete 54 and asphalt 56. In some embodiments, the CAD module 52 is trained off-line. The CAD module 52 can then be run on each new image to be processed to identify pixels containing asphalt or concrete. This removes trees, grass, dirt, and other types of land cover from consideration.

As shown in FIG. 3, CAD module 52 may distinguish different classified parking lot surface material. In some embodiments, the images may indicate different classified parking lot surface material and other material with colors, various levels of shading, or other distinguishing marks.

The CAD module 52 may also account for roads and other concrete 54 and asphalt 56 areas that may be mistaken for parking lots 44. For example, the CAD module 52 may factor in ancillary databases such as OPENSTREETMAP™ that contain linear road features including centerlines for most of the world's roads, as well as metadata related to road type and lane count. This road information can be used to mask asphalt and concrete detection, so that roads are not considered. While parking lot and building footprints are also available from such data sources, such information may be less reliable. Also building footprints cannot be reliably used to exclude parking lot detections, since some buildings have parking lots on the roof thereof. Accordingly, in some embodiments, only the road information is used from such data sources. Thus, the CAD module 52 may use the ancillary database information to modify the CAD classification results to increase detection accuracy and efficiency. In one embodiment, CAD module 52 may include at least 90% detection with at least 90% accuracy measured at the pixel level.

The second level module 60 may include a road marking detection (RMD) module 62. Both road lanes and also parking lot spots are typically marked with white or yellow lines. In some embodiments, no assumption is made as to color, but instead assumptions are made both (1) that the markings are locally brighter than their immediate surroundings, and (2) that the markings do not exceed one pixel (such features (marking lines) are commonly 15 cm wide, which is typically less than the pixel resolution of the imagery). In such cases, the panchromatic image data (which is of higher resolution than the multispectral image data) is used to extract the markings, since the features are less than a pixel in width. The image is filtered (2×2 morphological opening) and then subtracted from the original. This represents a differential morphological operation that identifies bright areas in an image that are locally less than 2 pixels wide.

Figure 4:
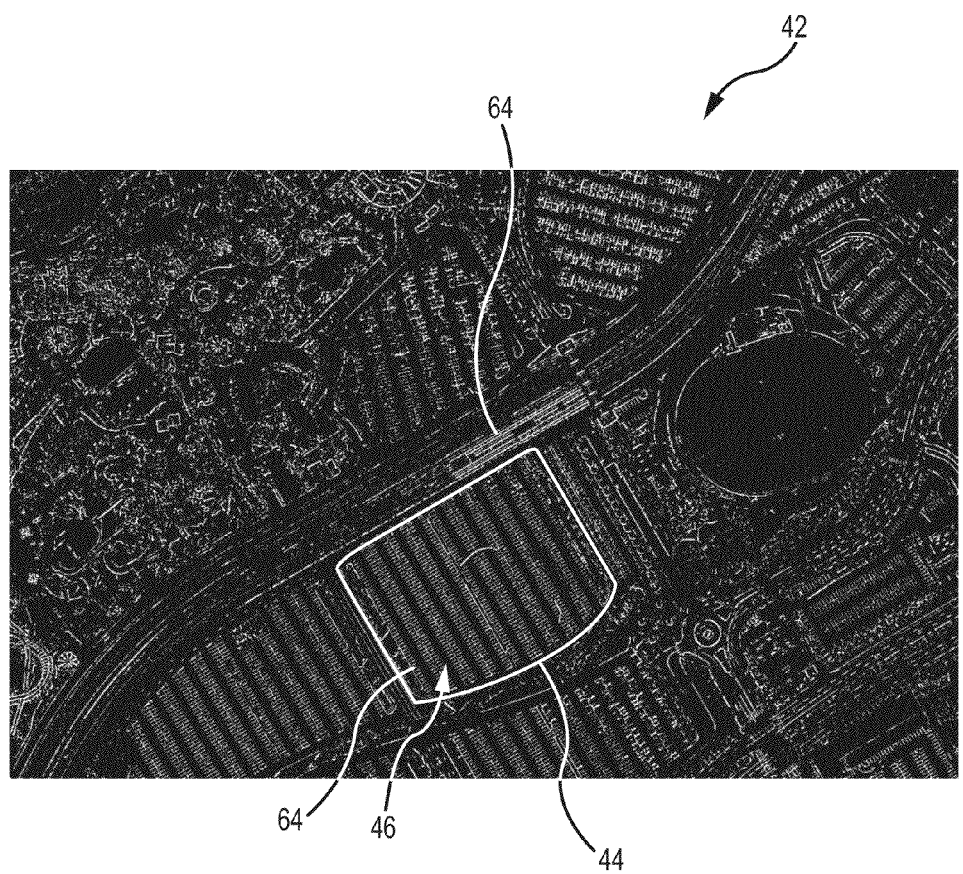
FIG. 4 is a remotely-sensed image showing detected marking lines.

The RMD module 62 may process the remotely-sensed imagery 42 to detect and identify lines 64 within a parking lot 44 or lines 64 that are part of a road, i.e. marking lines 64. RMD module 62 may require panchromatic images or other suitable high-resolution images to extract the marking lines 64 because the marking line 64 features are less than a pixel in width and may not be available to an acceptable degree of accuracy in lower-resolution imagery. RMD module 62 may process and analyze the high-resolution images 42 to extract marking lines 64 that may include street centerlines as well as parking row lines 46. As shown in FIG. 4, RMD module 62 may highlight parking row lines 46 and marking lines 64. In some embodiments, the images may indicate parking row lines 46 and marking lines 64 with colors or other appropriate indicators.

RMD module 62 may extract the marking lines 64 from the remotely-sensed image 42 by determining (1) that an area of subpixels are locally brighter than their surroundings, and (2) that the subpixels are not exceeding a resolution of one pixel. The RMD module 62 may further determine that an area of subpixels are locally brighter than their immediate surrounding subpixels by using local contrast features that are invariant to radiometric shifts. In some embodiments, the RMD module 62 may also factor in ancillary databases that contain linear road features to filter out lines 64 that are not parking row lines 46 to help increase detection accuracy and efficiency.

The RMD module 62 analysis may further include filtering the remotely-sensed image 42 and then subtracting the filtered image from the original image to identify bright areas in the original remotely-sensed image 42 that are locally less than 2 pixels wide. For example, the filtering process may use a 2×2 morphological opening including morphological erosion, followed by a dilation. In such an embodiment, the RMD module 62 may use a 2×2 square structuring element where the dilation (erosion) computes the maximum (minimal) value at a local neighborhood at each pixel. The neighborhood is given by the structuring element. In one embodiment, RMD module 62 may include at least 90% detection with at least 80% accuracy measured at the pixel level.

Figure 5:
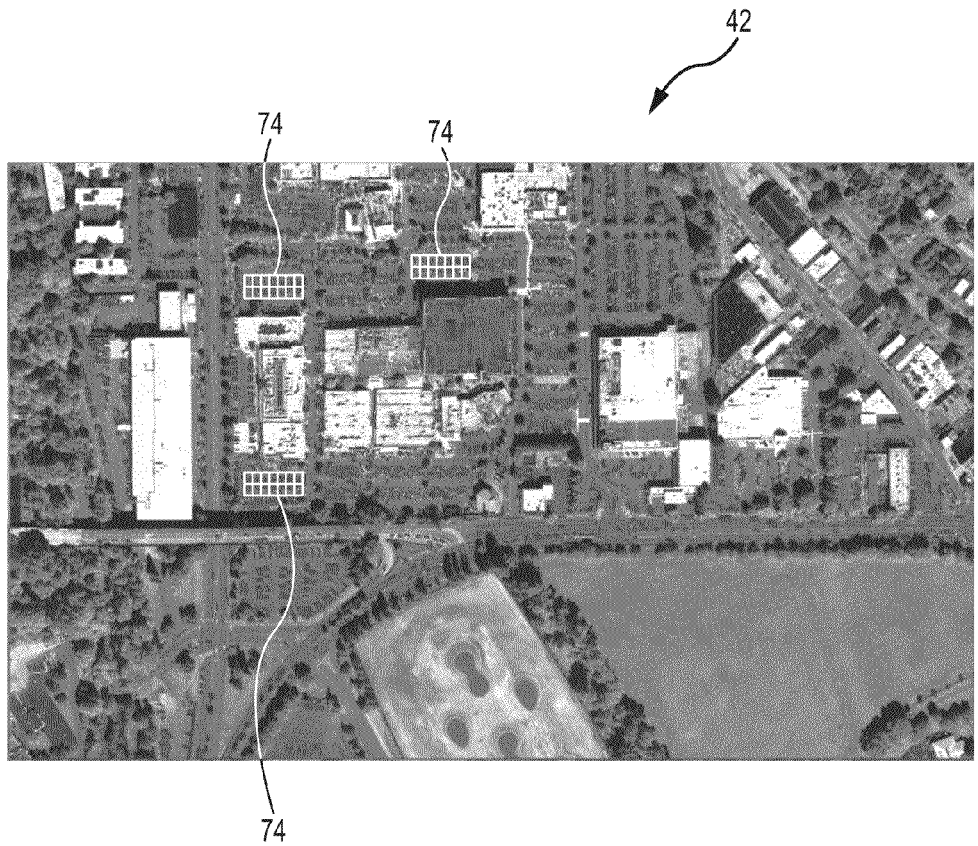
FIG. 5 is a remotely-sensed image showing detected vehicles.

The third level module 70 may be used to detect an object of interest such as a car or a vehicle 74, as shown in FIG. 5. The algorithm may be applied to the higher-resolution panchromatic image data. Car detections are given in terms of a centroid and an orientation. The remotely-sensed images 42 may indicate vehicles 74 with distinguishing colors or outlines. In one embodiment, the third level module 70 may include a vehicle detection (VD) module 72. The VD module 72 may process data from the remotely-sensed imagery 42 to develop a vehicle detector. The processing includes analyzing remotely-sensed imagery 42 to detect vehicles 74 using classifiers based on Histograms of Oriented Gradients features, Haar features, and other similar detection features. In some embodiments, identifying vehicles 74 with the VD module 72 may include developing a first set of weak classifiers based on Histogram of Oriented Gradient features and developing a second set of weak classifiers based on Haar features. The VD module 72 may then train the first and second set of weak classifiers to detect vehicles 74 with the developed classifiers. The VD module 72 may also cascade the first and second set of weak classifiers to improve detection accuracy. In some embodiments, VD module 72 may include at least a 95% detection with at least a 85% to 90% accuracy. An example of a suitable car counting algorithm is disclosed in U.S. patent application Ser. No. 13/942,544, filed Jul. 15, 2013, the contents of which are incorporated herein by reference.

Figure 6:
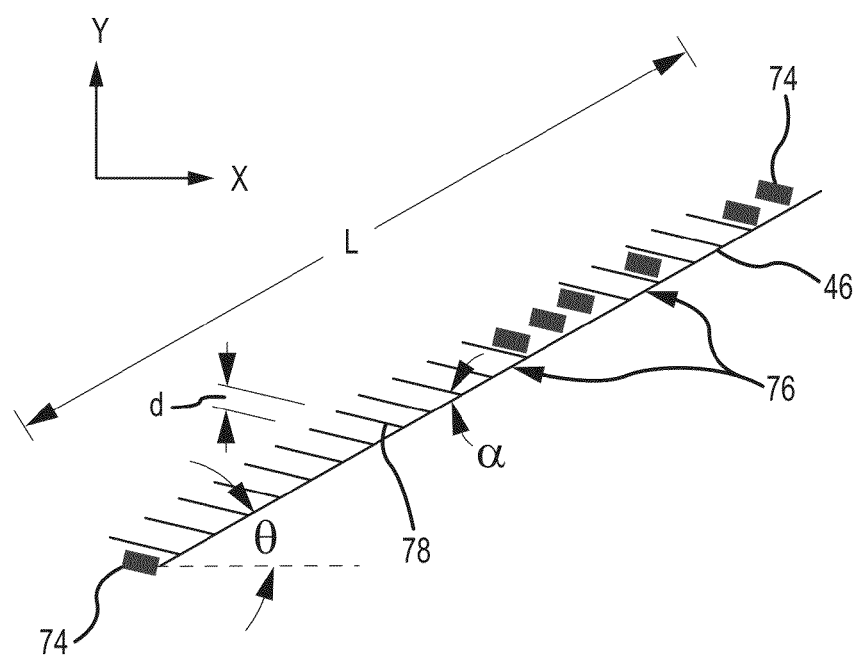
FIG. 6 is an image showing parking row parameters.
Figure 7:
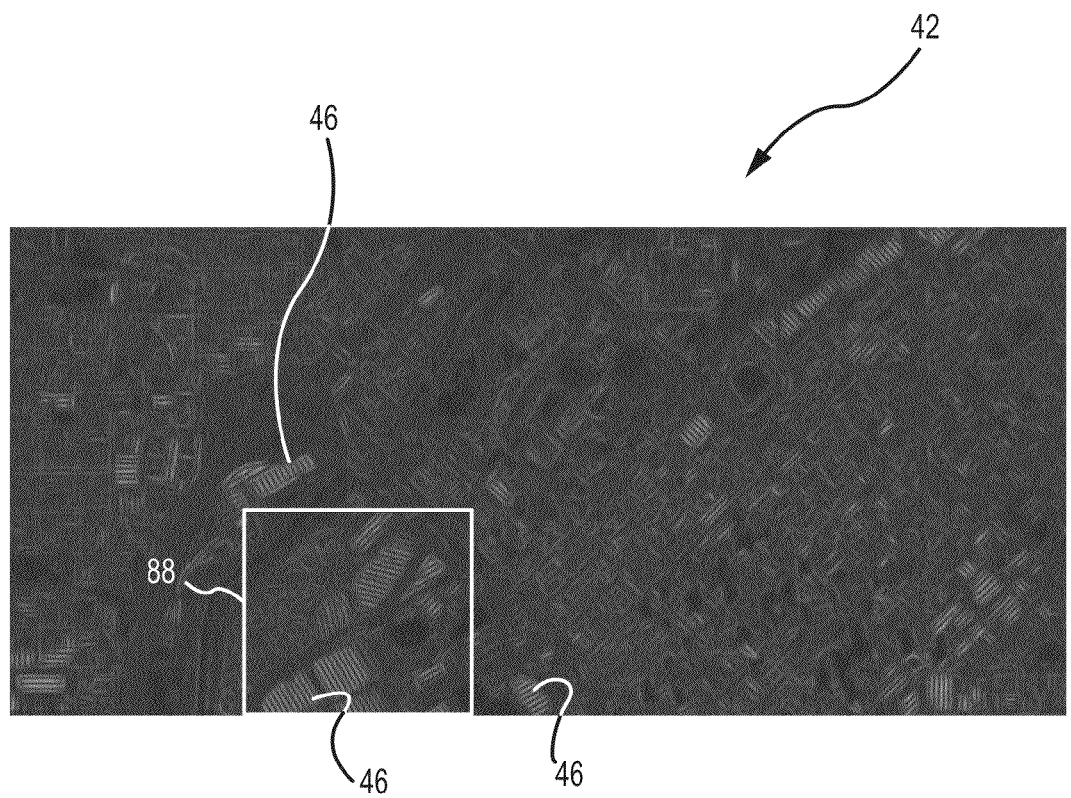
FIG. 7 is a remotely-sensed image prior to masking.
Figure 8:
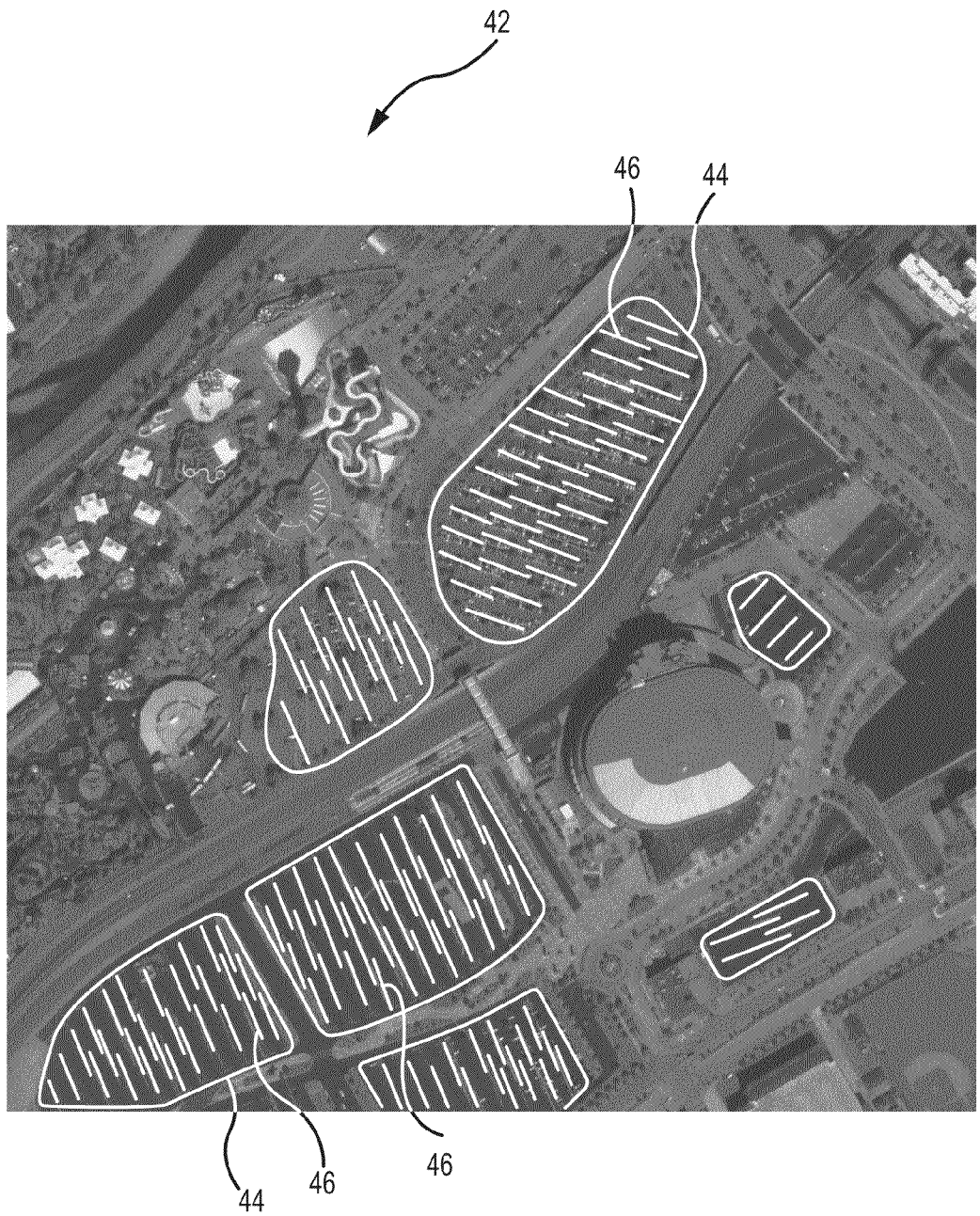
FIG. 8 is a remotely-sensed image after masking.

Primarily referring now to FIGS. 6-8. The fourth level module 80 may include Hough aggregation for parking row detection (HAPRD) module 82. The HAPRD module 82 may process the remotely-sensed imagery 42 to detect and identify parking rows 46. The processing includes analyzing the remotely-sensed imagery 42 to achieve robust detection of parking rows 46. In order to achieve robust detection, the HAPRD module 82 may exploit a spatial regularity property commonly found in parking rows 46 and assign several parameters to describe the parking rows 46. As shown in FIG. 6, the HAPRD module 82 may define:
  i) a 2-D position (x,y);
  ii) a parking row length (L) in meters;
  iii) a parking row orientation angle ($\theta$);
  iv) a parking stripe 78 orientation angle ($\alpha$) corresponding to the orientation of the parking stripe 78 versus the parking row 46 (generally one of 135, 180, 225 degrees);
  v) a parking row spacing (d) representing the average width of a parking spot; and
  vi) a stripe spacing (d2) (not shown in FIG. 6) representing the distance between pairs of parking stripes 78 that separate adjacent parking spots 76.

Spacing (d2) between pairs of parking stripes 78 may vary to allow for increased spacing between adjacent parking spots 76. However, many existing parking lot detection and identification systems do not account for such spacing variations. HAPRD module 82 accounts for such variations by assigning different (d2) values. When a single parking stripe 78 delineates two adjacent parking spots 76, (d2) equals 0. On the other hand, when two distinct parking stripes 78 are separated by a nominal distance, (d2) may be in the range of 50 cm. The HAPRD module 82 may fix parking row length (L) at 50 m to compute the maximum score over the set of parameters (L, $\theta$, $\alpha$, d, and d2) at each pixel. Locally maximal values above a defined threshold are considered positive parking row 46 detections. For each positive parking row detection, the HAPRD module 82 may provide the structural parking row 46 information. To determine the location of each parking row 46, the HAPRD module 82 may calculate the parameters by first assuming a typical length (Ls) for a stripe 78. As shown in FIG. 8, HAPRD module 82 may highlight parking rows 46. In some embodiments, the images may indicate parking rows 46 with colors or other distinguishing markers.

In some embodiments, the values at adjacent pixels having the same parameters may be computed recursively to reduce computation time by defining functions in which the function being defined is applied within its own definition. HAPRD module 82 may use the following algorithm to detect and identify parking rows 46.

At position x0=(x0, y0) the response f(x0) is:

$$f(x0) = \text{SUM}(j=-Ls/2 \ldots Ls/2)\{\text{SUM}(i=-N/2 \ldots N/2) \{\lambda(x0+i*(d+d2)*u+j*v) + \lambda(x0+[i*(d+d2)-d2]*u+j*v)\}\} + C*\text{SUM}(\text{car detections})\{\lambda c(x_{car} \text{ inside the rhomboid}(x0+/-N/2*(d+d2)*u+/-Ls/2*v)\}$$

where N=the number of parking spots in a given row=L/(d+d2)
  u (2-D vector quantity)=$(\cos \theta, \sin \theta)$
  v (2-D vector quantity)=$(\cos(\theta-\alpha), \sin(\theta-\alpha))$
  $\lambda$ (x) (where x is a 2-D vector quantity) is an indicator function returning 1 if an RMD detection occurred within a 1 pixel distance of x, or 0 otherwise.
  $\lambda c$ ( ) is an indicator function returning 1 if the given car detection centroid, $x_{car}$, lies within the rhomboid and the orientation is within 45 degrees of $\theta-\alpha$, or 0 otherwise. This indicator function may be evaluated over all car detections.

Once HAPRD module 82 detects and identifies parking rows 46, PLD system 20 may detect and identify parking lots 44. Based on information provided from the various modules, PLD system 20 may provide various dimensional parameters for parking lots 44 in remotely-sensed imagery 42. The multiple modules including the CAD module 52, RMD module 62, VD module 72, and HAPRD module 82 may interact simultaneously or separately to detect and identify parking lots 44 in remotely-sensed imagery 42 with a high degree of accuracy. For example, the CAD module 52, RMD module 62, and HAPRD module 82 may process data independently from the VD module 72. However, using the VD module 72 with the CAD module 52, RMD module 62, and HAPRD module 82 together may significantly increase processing time and detection accuracy.

In some embodiments, the CAD module 52 may process a remotely-sensed image 42 such as a multispectral image while the RMD module 62 and VD module 72 are processing a remotely-sensed image 42 such as a panchromatic or short-wave infrared image. After the CAD module 52, RMD module 62, and VD module 72 process the images, the PLD system 20 may mask the image processed by the CAD module 52 with the image processed by the RMD module 62 and VD module 72. The masked image may then be processed by the HAPRD module 82 to detect and identify parking lots within the masked image. Similarly, the remotely-sensed image 42 may be processed by only one module before being masked with a remotely-sensed image 42 that is processed by HAPRD module 82. FIG. 7 shows parking rows 46 detected and identified by HARPD module 82 prior to masking. FIG. 8 shows a portion 88 of FIG. 7 having parking rows 46 detected and identified by HARPD module 82 after masking.

Along these lines, in some embodiments, the method for identifying parking lots 44 in a remotely-sensed image 42 may include receiving a first remotely-sensed image 42 having zero or more parking lots 44 and identifying a first set of pixels related to a parking lot feature within the first remotely-sensed image 42 with a first module to create a first image. In such an embodiment, the features may relate to various parking lot items. The method may then include receiving a second remotely-sensed image 42 having zero or more parking lots 44 and masking the first image with the second remotely-sensed image 42 to create a masked image. Once the masked image is created, the method may include identifying a second set of pixels related parking row features in the masked image and identifying a parking lot 44 based on the identified at least one parking row features. Accordingly, processing various types of remotely-sensed imagery 42, including multispectral, panchromatic, and short-wave infrared, with multiple level modules may significantly increase processing speeds and detection accuracy.

Figure 9:
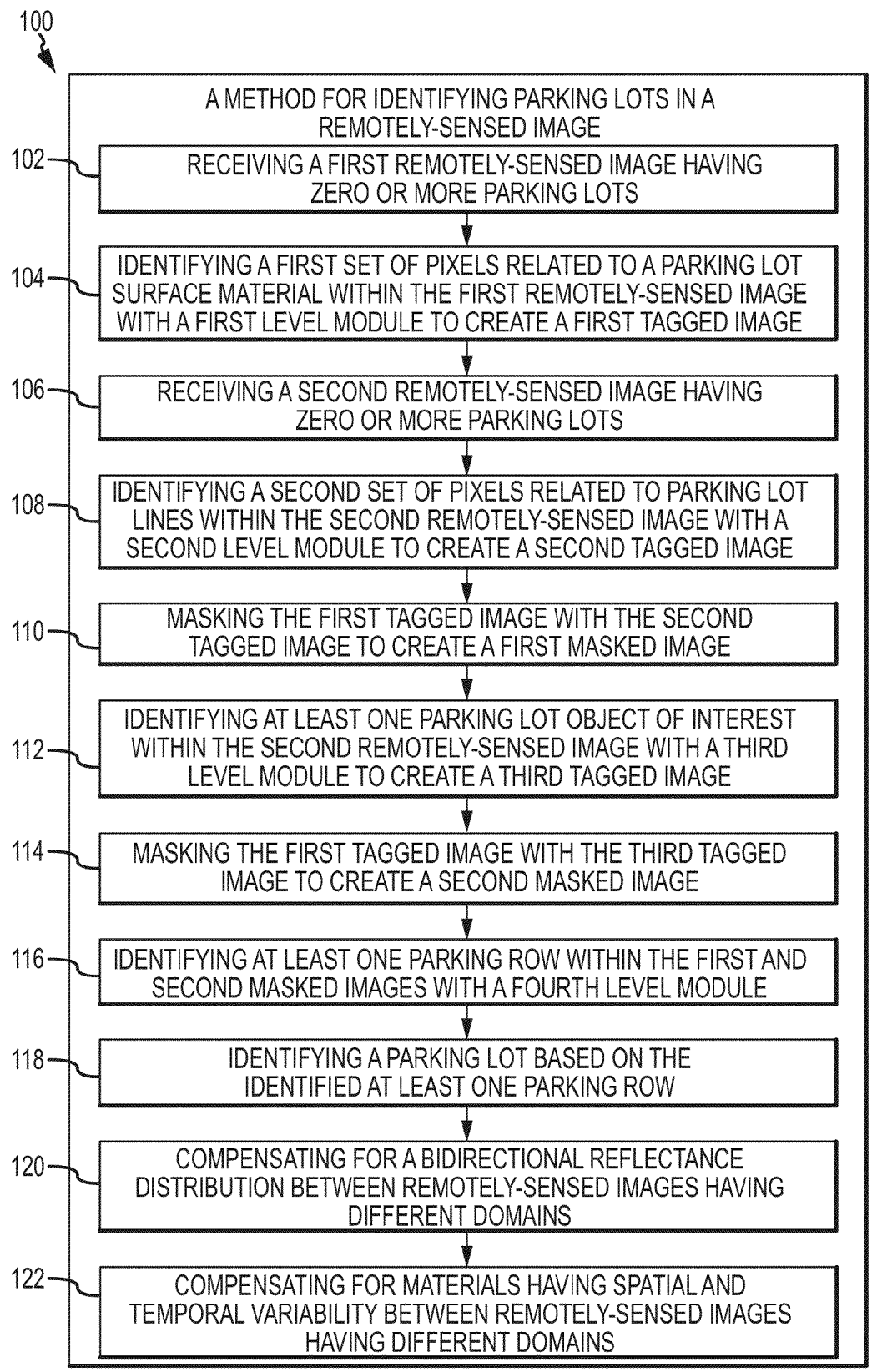
FIG. 9 is an exemplary embodiment of one method for identifying parking lots within remotely-sensed imagery.

As shown in FIG. 9, in one embodiment, the method 100 for identifying parking lots 44 in a remotely-sensed image 42 may include receiving 102 a first remotely-sensed image 42 having zero or more parking lots 44. The first remotely-sensed image 42 may include a multispectral image or other suitable resolution image. Once received, the method 100 may include identifying 104 a first set of pixels related to a parking lot surface material, such as concrete 54 and asphalt 56, within the first remotely-sensed image 42 with a first level module 50, such as the CAD module 52, to create a first tagged image. Next, the method 100 may include receiving 106 a second remotely-sensed image 42 having zero or more parking lots 44. The second remotely-sensed image 42 may include a panchromatic image or short-wave infrared image, or other suitable high-resolution images. The method 100 may then include identifying 108 a second set of pixels related to parking lot lines 64 within the second remotely-sensed image 42 with a second level module 60, such as the RMD module 62, to create a second tagged image. The method 100 may then include masking 110 the first tagged image with the second tagged image to create a first masked image. Next, the method 100 may include identifying 112 at least one parking lot object of interest within the second remotely-sensed image 42 with a third level module 70, such as the VD module 72 to create a third tagged image. The method 100 may then include masking 114 the first tagged image with the third tagged image to create a second masked image. Method 100 may also include identifying 116 at least one parking row 44 within the first and second masked images with a fourth level module 80, such as the HAPRD module 82 and identifying 118 a parking lot 44 based on the identified at least one parking row 46. In some embodiments, the method 100 may further include compensating 120 for a bidirectional reflectance distribution between remotely-sensed images 42 having different domains. In addition, the method 100 may include compensating 122 for materials having spatial and temporal variability between remotely-sensed images 42 having different domains.

Figure 10:
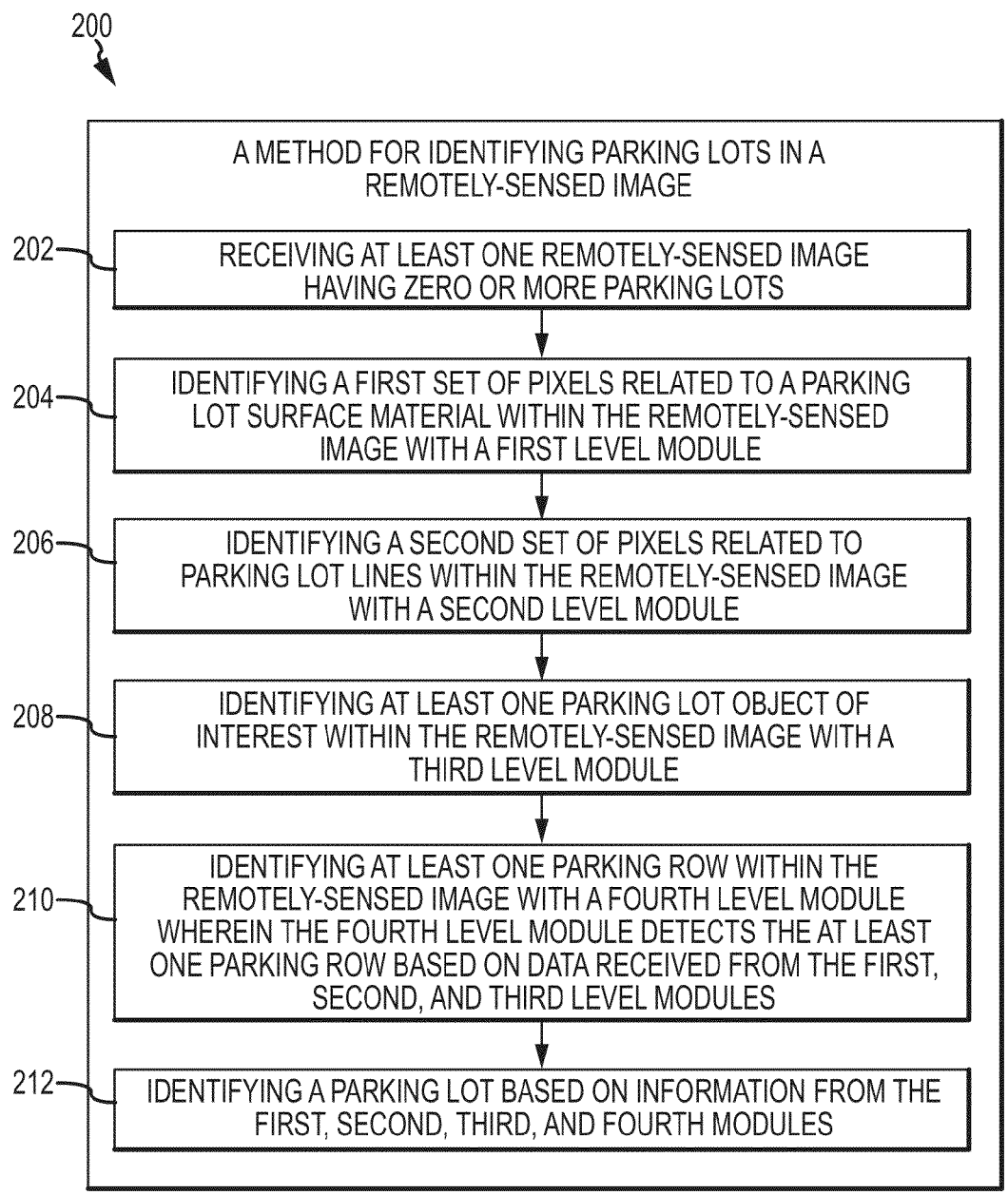
FIG. 10 is an exemplary embodiment of another method for identifying parking lots within remotely-sensed imagery.

In another embodiment, shown in FIG. 10, method 200 for identifying parking lots in a remotely-sensed image may include receiving 202 at least one remotely-sensed image 42 having zero or more parking lots 44. Method 200 may include identifying 204 a first set of pixels related to a parking lot surface material within the remotely-sensed image 42 with a first level module 50, such as the CAD module 52. Method 200 may include identifying 206 a second set of pixels related to parking lot lines 64 within the remotely-sensed image 42 with a second level module 60, such as the RMD module 62. Method 200 may also include identifying 208 at least one parking lot object of interest, such as a vehicle 74, within the remotely-sensed image 42 with a third level module 70, such as the VD module 72. Method 200 may include identifying 210 at least one parking row 46 within the remotely-sensed image 42 with a fourth level module 80 such as the HAPRD module 82 that detects the at least one parking row 46 based on data received from the first, second, and third level modules. The method 200 may then include identifying 212 a parking lot 44 based on information from the first, second, third, and fourth modules. In some embodiments, the HAPRD module 82 may also exploit at least one spatial regularity property commonly found in parking rows 46. The HAPRD module 82 may then analyze the at least one remotely-sensed image 42 based on the exploited spatial regularity property and identify zero or more parking rows 46 in the at least one remotely-sensed image 42.

In one embodiment, PLD system 20 may include a Parking Lot Domain Adaptation (PLDA) module 90 to help detect and identify parking lots 44 in the remotely-sensed imagery 42 across different domains having different datasets. When the modules are trained in one part of a remotely-sensed image 42 and then evaluated in another part, the efficiency and accuracy of detection and identification is increased due to overlapping domains having similar datasets. For example, a module trained to recognize specific objects in a remotely-sensed multispectral image having a domain with a specific dataset can more efficiently and accurately detect those objects in another remotely-sensed multispectral image having an overlapping domain with a similar dataset because the module is familiar with the corresponding dataset. However, when modules are applied to other remotely-sensed images 42 having different domains with different datasets, the modules accuracy is typically degraded. Differences between datasets in domains can be a result of multiple factors, including radiometric differences in the imagery caused by solar and atmospheric effects. In some embodiments, PLD system 20 compensates for the solar and atmospheric effects by calibrating surface reflectance through domain adaptation. However, in other embodiments, the differences between domains may be amplified due to bidirectional reflectance distribution function (BRDF) effects (i.e., effects of light reflected off opaque surfaces), as well as the material properties of the imaged objects having both spatial and temporal variability. For example, in addition to BRDF effects, one image may include parking lots 44 with predominately black asphalt that produces a specific dataset, while another image may include parking lots 44 with predominately grey concrete that produces a different dataset, etc.

In order to compensate for the BDRF effects and other variances across different domains, the PLD system 20 may utilize PLDA module 90 that uses results from textural-based detectors to locally adapt both the spectral information as well as the spectral classifier itself to obtain an optimal joint textural+spectral classifier. Spectral feature data relates to the individual spectral channels (wavelengths) captured at each pixel. Textural feature data relates to the spatial distribution of tonal variations within the images. One advantage of the PLDA module 90 approach is that it does not require surface reflectance calibration, but surface reflectance calibration may yield some benefit under certain conditions.

In order to better compensate for different datasets between different domains, PLDA module 90 may use linear classifiers, as opposed to nonlinear classifiers, for faster and simpler classifier training and adaptation. Nonlinear classifiers may be avoided if the feature space is first transformed using a sparse code representation from a codebook and then followed by spatial max-pooling operations. One advantage of linear classifiers is that the identification of multiple object types can be performed in constant time using locality sensitive hashing structures. PLDA module 90 may be used with panchromatic images, multispectral images, short-wave infrared images, or with other remotely-sensed images.

Using the standard notation of representing object/class labels by Y, and the input feature space as X, PLDA module 90 trains a detector which maximizes the discriminate $E(Y|X)$. Classic domain adaptation approaches assume that the statistics of X change between images, and seek to transform X in the evaluation image to the X in the training image. Oftentimes, the classifier itself is unchanged by this process. Surface reflectance calibration is one such example. Other approaches utilize incremental learning, and interpolate between the two spaces using, for example, Grassmann manifolds, and retrain the classifier on the fly to operate on the entire manifold. Performance of such methods can vary significantly, as the retraining is not related to any specific detection information in the evaluation image. Instead, PLDA module 90 learns a relationship between textural features only and textural+spectral features of the parking lots 44, which improves consistency across domains. Accordingly, PLDA module 90 is capable of identifying a more efficient adaptation which agrees with this learned relationship between textural features only and textural+spectral features.

A parametric set of transformations is defined for mapping the spectral information between images. At its simplest, this can be a gain and bias per channel for an entire image strip, but more variables for fitting spline or piecewise linear curves per channel can be added. In addition, such parameters can be placed on a sparse rectangular grid throughout the strip, with smooth interpolation between grid points. Using labeled training data, simple least squares provides the adaptation solution. This adjustment also may be performed using all labeled object classes over a scene, as they have the same spectral adaptation. PLDA 90 may then learn a relationship between the two classifiers. As the final stage of each classifier is linear, the output is an activation potential which is optimally thresholded. The unthresholded output of the first classifier may be $y_t$, and the second classifier $y_{tsr}$. For binary classification (1 vs all), the potentials are typically normalized during training to be in the range $[-1, +1]$ corresponding to non-detection/detection, respectively, with a decision threshold of 0. From the training data, PLDA 90 may learn a conditional likelihood $P(Y_{tsr}|Y_t)$ for each texture output potential. In general, a strong correlation should exist in the responses between the two detectors, with the combined classifier having higher mean absolute activation and smaller variance. The conditional likelihoods capture this relationship, which PLDA 90 expects to hold in aggregate across domains. In a test image, the number of constraints (activation potentials from all computed windows for all classes), vastly exceeds the set of adaptation parameters, so the conditional likelihoods need only hold in aggregate. Denoting the adaptation parameters on X by $\theta$, and the estimated classifier potentials by $y'_t$ and $y'_{tsr}$, the adaptation can be formulated as an optimization problem of finding the set of parameters which minimize the KL divergence between the estimated and expected conditional likelihoods:

$$\arg\min_\theta \Sigma_j \Sigma_i w(Y'_{t,i,j}) * KL\{P(Y_{tsr,j}|Y'_{t,i,j}), Y'_{tsr,i,j}(\theta)\} - \log p(\theta)$$

KL{ } represents the symmetric KL divergence. The summation is computed over all classes (j) at each window (i) in the test image, with the detection done in standard sliding window fashion. W is a vector of weights learned for each texture activation potential value from the training/validation data. The off-line learning of W relates optimization of this functional to actual improvement in classification performance. This learning can also include a sparsity penalty term (|W|) in order to minimize the number of nonzero elements in W. PLDA 90 expects that the largest and smallest activation responses convey the most information, with those in the middle reflecting more uncertainty. A regularization prior on $\theta$ is given by $p(\theta)$. This term enforces spatial smoothness when a rectangular grid of parameters is used, and also controls the desired degree of adaptation. For example, if the data is first calibrated to surface reflectance, then the prior should penalize larger adaptations than if DNs (uncalibrated image digital numbers) are adapted. In order to make the optimization function differentiable, the max-pooling stage of the classification can be replaced by a logistic softmax. Standard nonlinear solvers such as Levenberg-Marquardt, with an LDL or Cholesky decomposition at each iteration may be used. Note that a sparse number of labeled examples may be available for the test image. This may be due to some classes being available in public sources such as OPENSTREETMAP™, or due to a limited amount of crowd sourcing being performed on the image. If present, PLDA 90 assumes such data sources are sparse and incomplete, but the examples can be readily added into the optimization function using a standard hinge loss metric.

Figure 11:
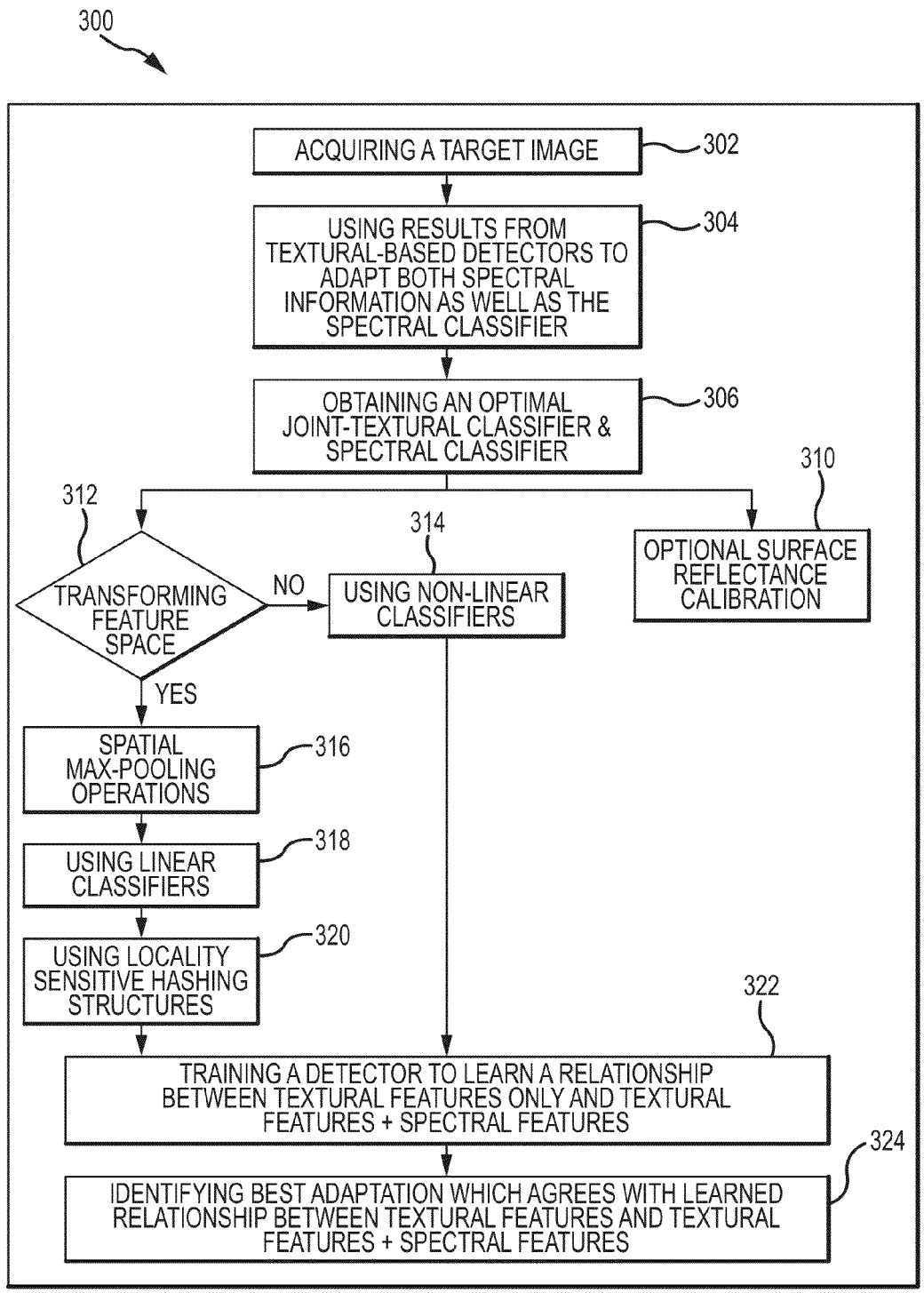
FIG. 11 is an exemplary embodiment of one method for parking lot domain adaptation.

In one embodiment of PLDA module 90 may implement method 300 shown in FIG. 11, including acquiring 302 a target image. The method 300 may include using 304 results from textural-based detectors to adapt both spectral information as well as the spectral classifier. Method 300 may further include obtaining 306 an optimal joint-textural classifier and spectral classifier. The method 300 may also include an optional 310 surface reflectance calibration. Method 300 may include transforming 312 feature space. If the feature space is not transformed, then method 300 may use non-linear classifiers training 322 a detector to learn a relationship between textural features only and textural features+spectral features. If the feature space is transformed, then method 300 may include spatial max-pooling 316 operations, using 318 linear classifiers, and using 320 locality sensitive hashing structures before training 322 a detector to learn a relationship between textural features only and textural features+spectral features. Method 300 may then include identifying 324 the best adaptation which agrees with learned relationship between textural features and textural features+spectral features.

The following description is but one example of how the disclosed techniques may be implemented. The techniques disclosed herein may be implemented on hardware or a combination of software and hardware. For example, they may be implemented in an operating system kernel, in a separate user process, in a library package bound into network applications, on a specially constructed machine, on an application-specific integrated circuit, or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 12:
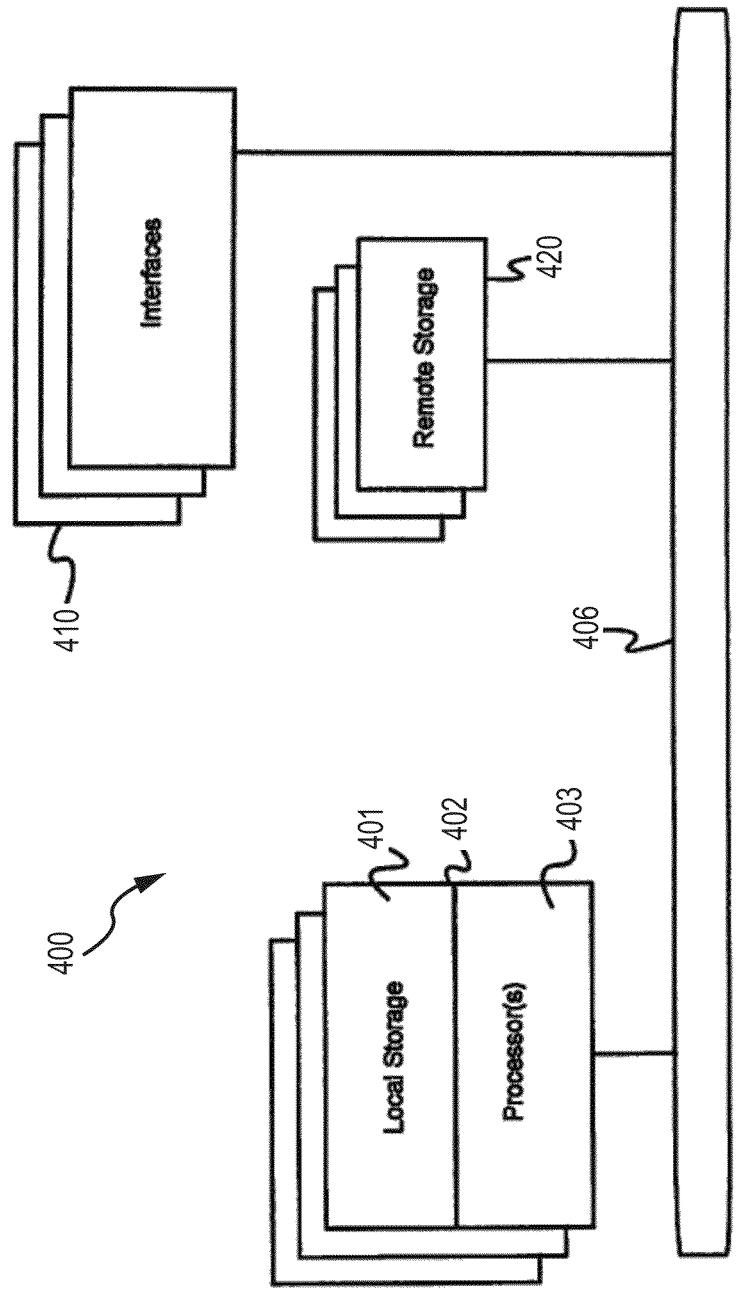
FIG. 12 is a block diagram illustrating an exemplary hardware architecture of a computing device used in an embodiment.

Referring now to FIG. 12, there is shown a block diagram depicting an exemplary computing device 400 suitable for implementing at least a portion of the features or functionalities disclosed herein. Computing device 400 may be, for example, any one of the computing machines listed in the previous paragraph, or indeed any other electronic device capable of executing software- or hardware-based instructions according to one or more programs stored in memory. Computing device 400 may be adapted to communicate with a plurality of other computing devices, such as clients or servers, over communications networks such as a wide area network, a metropolitan area network, a local area network, a wireless network, the Internet, or any other network, using known protocols for such communication, whether wireless or wired.

In one embodiment, computing device 400 includes one or more central processing units (CPU) 402, one or more interfaces 410, and one or more busses 406 (such as a peripheral component interconnect bus). When acting under the control of appropriate software or firmware, CPU 402 may be responsible for implementing specific functions associated with the functions of a specifically configured computing device or machine. For example, in at least one embodiment, a computing device 400 may be configured or designed to function as a server system utilizing CPU 402, local memory 401 and/or remote memory 420, and interface(s) 410. In at least one embodiment, CPU 402 may be caused to perform one or more of the different types of functions and/or operations under the control of software modules or components, which for example, may include an operating system and any appropriate applications software, drivers, and the like.

CPU 402 may include one or more processors 403 such as, for example, a processor from one of the Intel, ARM, Qualcomm, and AMD families of microprocessors. In some embodiments, processors 403 may include specially designed hardware such as application-specific integrated circuits, electrically erasable programmable read-only memories, field-programmable gate arrays, and so forth, for controlling operations of computing device 400. In a specific embodiment, a local memory 401 (such as non-volatile random access memory and/or read-only memory, including for example one or more levels of cached memory) may also form part of CPU 402. However, there are many different ways in which memory may be coupled to system 400. Memory 401 may be used for a variety of purposes such as, for example, caching and/or storing data, programming instructions, and the like. As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 410 are provided as network interface cards (NICs). Generally, NICs control the sending and receiving of data packets over a computer network; other types of interfaces 410 may for example support other peripherals used with computing device 400. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus, Serial, Ethernet, Firewire™, PCI, parallel, radio frequency, Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode interfaces, high-speed serial interface interfaces, Point of Sale interfaces, fiber data distributed interfaces, and the like. Generally, such interfaces 410 may include ports appropriate for communication with appropriate media. In some cases, they may also include an independent processor and, in some in stances, volatile and/or non-volatile memory (e.g., RAM).

Although the system shown in FIG. 12 illustrates one specific architecture for a computing device 400 for implementing one or more of the inventions described herein, it is by no means the only device architecture on which at least a portion of the features and techniques described herein may be implemented. For example, architectures having one or any number of processors 403 may be used, and such processors 403 may be present in a single device or distributed among any number of devices. In one embodiment, a single processor 403 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 420 and local memory 401) configured to store data, program instructions for the general-purpose network operations, or other information relating to the functionality of the embodiments described herein (or any combinations of the above). Program instructions may control execution of or comprise an operating system and/or one or more applications, for example. Memory 420 or memories 401, 420 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape, optical media such as CD-ROM disks, magneto-optical media such as optical disks, and hardware devices that are specially configured to store and perform program instructions, such as read-only memory devices, flash memory, solid state drives, memristor memory, random access memory, and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 13:
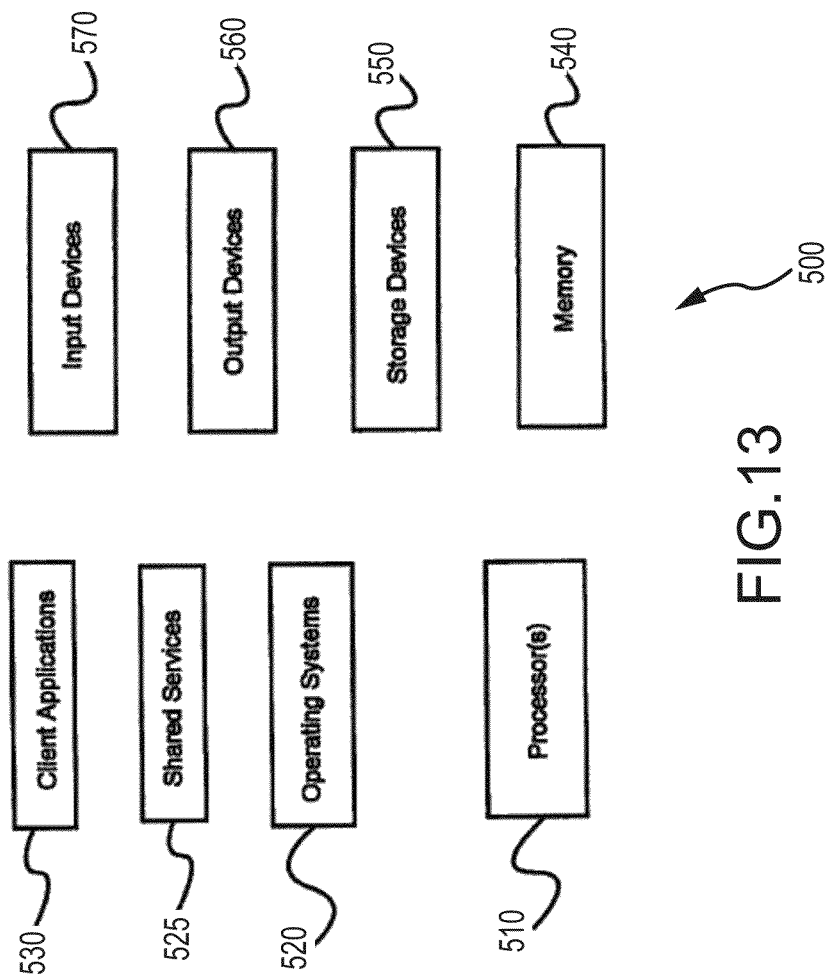
FIG. 13 is a block diagram illustrating an exemplary logical architecture for a client device, according to an embodiment.

In some embodiments, systems according to the present invention may be implemented on a standalone computing system. Referring now to FIG. 13, there is shown a block diagram depicting a typical exemplary architecture of one or more embodiments or components thereof on a standalone computing system. Computing device 500 includes processors 510 that may run software that carry out one or more functions or applications of embodiments of the invention, such as for example a client application 530. Processors 510 may carry out computing instructions under control of an operating system 520 such as, for example, a version of Microsoft's Windows™ operating system, Apple's Mac OS/X or iOS operating systems, some variety of the Linux operating system, Google's Android™ operating system, or the like. In many cases, one or more shared services 525 may be operable in system 500, and may be useful for providing common services to client applications 530. Services 525 may for example be Windows™ services, user-space common services in a Linux environment, or any other type of common service architecture used with operating system 510. Input devices 570 may be of any type suitable for receiving user input, including for example a keyboard, touchscreen, microphone (for example, for voice input), mouse, touchpad, trackball, or any combination thereof. Output devices 560 may be of any type suitable for providing output to one or more users, whether remote or local to system 500, and may include for example one or more screens for visual output, speakers, printers, or any combination thereof. Memory 540 may be random-access memory having any structure and architecture known in the art, for use by processors 510, for example to run software. Storage devices 550 may be any magnetic, optical, mechanical, memristor, or electrical storage device for storage of data in digital form. Examples of storage devices 550 include flash memory, magnetic hard drive, CD-ROM, and/or the like.

Figure 14:
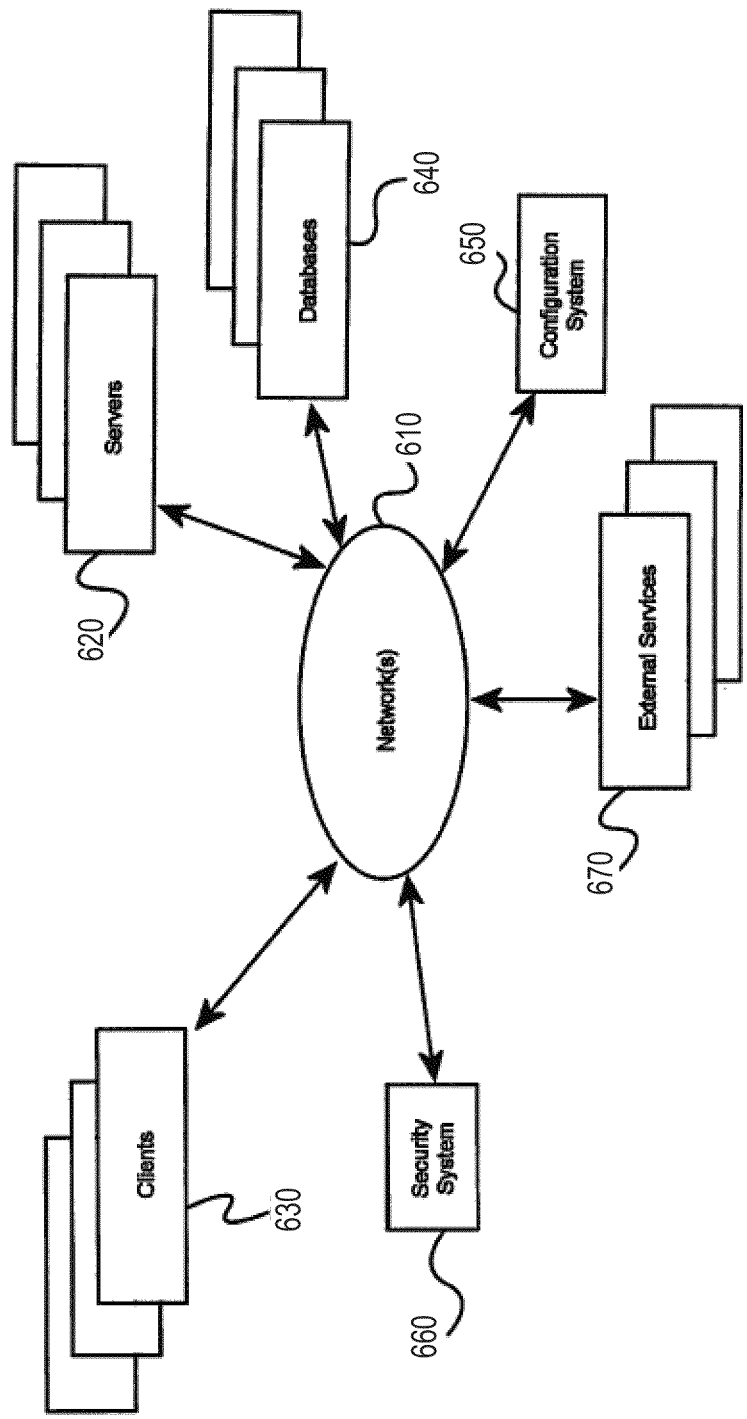
FIG. 14 is a block diagram showing an exemplary architectural arrangement of clients, servers, and external services, according to an embodiment.

In some embodiments, systems of the present invention may be implemented on a distributed computing network, such as one having any number of clients and/or servers. Referring now to FIG. 14, there is shown a block diagram depicting an exemplary architecture for implementing at least a portion of a system according to an embodiment of the invention on a distributed computing network. According to the embodiment, any number of clients 630 may be provided. Each client 630 may run software for implementing client-side portions of the present invention; clients may comprise a system 600 such as that illustrated in FIG. 13. In addition, any number of servers 620 may be provided for handling requests received from one or more clients 630. Clients 630 and servers 620 may communicate with one another via one or more electronic networks 610, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 610 may be implemented using any known network protocols, including for example wired and/or wireless protocols.

In addition, in some embodiments, servers 620 may call external services 670 when needed to obtain additional information, or to refer to additional data concerning a particular call. Communications with external services 670 may take place, for example, via one or more networks 610. In various embodiments, external services 670 may comprise web-enabled services or functionality related to or installed on the hardware device itself. For example, in an embodiment where client applications 630 are implemented on a smartphone or other electronic device, client applications 630 may obtain information stored in a server system 620 in the cloud or on an external service 670 deployed on one or more of a particular enterprise's or user's premises.

In some embodiments of the invention, clients 630 or servers 620 (or both) may make use of one or more specialized services or appliances that may be deployed locally or remotely across one or more networks 610. For example, one or more databases 640 may be used or referred to by one or more embodiments of the invention. It should be understood by one having ordinary skill in the art that databases 640 may be arranged in a wide variety of architectures and using a wide variety of data access and manipulation means. For example, in various embodiments one or more databases 640 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 660 and configuration systems 650. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 660 or configuration system 650 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Accordingly, novel and improved methods and apparatus for reliably detecting and identifying parking lots from remotely-sensed imagery are disclosed. In some embodiments, remotely-sensed imagery processing system 10 works with satellite imaging system 30 which collect data in spectral channels, with, for example, a broad bandwidth approximately of 400 nm-900 nm. However, embodiments also function on other regions of the electromagnetic spectrum in the infrared spectrum, including short-wave infrared bands greater than 900 nm. Those of ordinary skill in the art will appreciate that the various illustrative modules described in connection with the embodiments disclosed may be implemented as electronic hardware, computer software, or combinations of both. To clearly illustrate this interchangeability of hardware and software, various illustrative components and modules have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The above summary of some example embodiments is not intended to describe each disclosed embodiment or every implementation of the invention. Having set forth the various embodiments, it is anticipated that suitable modifications can be made which will nonetheless remain within the scope of the invention. The invention shall therefore only be construed in accordance with the following claims.

What is claimed is:

1. A method for identifying parking lots in a remotely-sensed image, the method comprising:
   receiving at least one remotely-sensed image having zero or more parking lots;
   identifying a first set of pixels related to a parking lot surface material within the remotely-sensed image with a parking lot surface module;
   identifying a second set of pixels related to parking lot lines within the remotely-sensed image with a road-markings module;
   identifying at least one parking lot object of interest within the remotely-sensed image with a vehicle detection module;
   identifying at least one parking row within the remotely-sensed image with a parking row detection module, wherein the parking row detection module detects the at least one parking row based on data received from the parking lot surface, road-markings, and vehicle detection modules; and
   identifying a parking lot based on information from the parking lot surface, road-markings, vehicle detection, and parking row detection modules.

2. The method according to claim 1, further comprising compensating for materials having spatial and temporal variability between remotely-sensed images having different domains.

3. The method according to claim 1, wherein identifying the first set of pixels with the parking lot surface module comprises: classifying the first set pixels with a decision tree classifier.

4. The method according to claim 1, wherein identifying the second set of pixels with the road-markings module comprises: identifying an area of subpixels that are locally brighter than surrounding subpixels; and checking that the subpixels are not exceeding a resolution of one pixel.

5. The method according to claim 1, wherein identifying the at least one parking lot object with the vehicle detection module comprises: developing a first set of weak classifiers based on Histogram of Oriented Gradient features; developing a second set of weak classifiers based on Haar features; training the first and second set of weak classifiers to detect the at least one parking lot object of interest; and cascading the first and second set of weak classifiers to improve detection accuracy.

6. The method according to claim 1, wherein identifying the at least one parking row with the parking row detection module comprises: establishing a spatial regularity property related to parking rows; assigning at least one parameter related to the parking rows; and detecting a parking row based on the established spatial regularity property and the at least one parameter.

7. The method according to claim 1 further comprising providing parking lot parameters.

8. The method according to claim 1, wherein the parking row detection module identifies parking rows with an accuracy rate of at least 90%.

9. The method according to claim 1, wherein the parking lot surface module can achieve an accuracy rate of at least 90%.

10. The method according to claim 1, wherein the road-markings module is applied to a panchromatic image.

11. The method according to claim 1, wherein the road-markings module is applied to a short-wave infrared image.

12. The method according to claim 1, wherein the parking row detection module assigns the at least one parameter related to the parking rows by analyzing a 2-D position, a row length, a first row orientation, a second row orientation angle corresponding to the orientation of the parking lot versus the row, a spacing representing the average width of a parking lot, and a parking lot stripe spacing representing the distance between the parking lot stripes on adjacent parking lots.

13. A method for identifying parking lots in a remotely-sensed image, the method comprising:
   receiving a first remotely-sensed image having zero or more parking lots;
   identifying a first set of pixels related to a parking lot surface material within the first remotely-sensed image with a first level module to create a first tagged image;
   receiving a second remotely-sensed image having zero or more parking lots;
   identifying a second set of pixels related to parking lot lines within the second remotely-sensed image with a second level module to create a second tagged image;
   masking the first tagged image with the second tagged image to create a first masked image;
   identifying at least one parking lot object of interest within the second remotely-sensed image with a third level module to create a third tagged image;
   masking the first tagged image with the third tagged image to create a second masked image;
   identifying at least one parking row within the first and second masked images with a fourth level module; and
   identifying a parking lot based on the identified at least one parking row.

14. The method according to claim 13, further comprising compensating for materials having spatial and temporal variability between remotely-sensed images having different domains.

* * * * *